United States Patent [19]
Chen

[11] Patent Number: 5,350,822
[45] Date of Patent: Sep. 27, 1994

[54] HIGH REFRACTIVE INDEX PLASTIC LENS COMPOSITION

[75] Inventor: Chi-Chang Chen, Hsinchu, Taiwan

[73] Assignee: Industrial Technology Research Institute, Hsinchu, Taiwan

[21] Appl. No.: 79,359

[22] Filed: Jun. 16, 1993

[51] Int. Cl.$^5$ .................. C08F 224/00; C08F 214/02; C08F 220/40; C08F 212/08; C08F 4/34
[52] U.S. Cl. .................. 526/266; 526/293; 526/327; 526/347; 526/227
[58] Field of Search .............. 526/266, 293, 327, 347, 526/227

[56] References Cited
U.S. PATENT DOCUMENTS
2,975,156  3/1961  Fekete ............................ 526/266
4,342,863  8/1982  Hohokabe et al. ................ 528/360

Primary Examiner—Joseph L. Schofer
Assistant Examiner—Wu C. Cheng
Attorney, Agent, or Firm—W. Wayne Liauh

[57] ABSTRACT

A plastic optical lens composition comprising about 40–60 wt% of monomer A, which is a hi-functional 3,9-divinylspirobi(m-dioxane); about 60–40 wt% of monomer B, which is either styrene or chlorostyrene; maleic acid di-allyl ester, the amount thereof is about 3–8 wt% of the aggregate amount of monomer A and monomer B; and a free radical polymerization initiator such as benzyl or dicumyl peroxide, the amount thereof is about 1–5 wt% of the aggregate amount of monomer A and monomer B. The plastic lens composition of the present invention exhibits high refractive index, low shrinkage factor, low specific gravity, low water absorption rate, excellent impact resistance and cutting and grinding processability, and can be polymerized using an injection molding process with substantially reduced reaction time.

10 Claims, No Drawings

HIGH REFRACTIVE INDEX PLASTIC LENS COMPOSITION

FIELD OF THE INVENTION

This invention relates to a plastic composition for use in making optical lenses. More particularly, this invention relates to a plastic composition for the manufacturing of high refractive index optical lenses, and the method of making the same, that exhibit low shrinkage factor and can be prepared in a substantially reduced reaction time.

BACKGROUND OF THE INVENTION

Polycarbonate (PC) and polystyrene (PS) have long been under extensive research effort as a substitute for inorganic glass in the manufacturing of optical lenses. Some of the disadvantages of these polymers have been noted. More specifically, polycarbonate shows inferior surface hardness and the optical lenses made therefrom often present double or even multiple refraction problems. On the other hand, polystyrene polymers lack impact and heat resistance, and exhibit poor cutting processability.

More recently, another polymer has also been developed as a base material in making optical lenses. This polymer, which is prepared from diethyl glycol bisallyl carbonate (hereinafter referred to as "CR-39", which is a trade name used by PPG, Pittsburg, Pa.), has shown to be light-weight, safe, and with excellent processability and dyeability. These advantageous properties have made CR-39 a superior product than inorganic optical materials. CR-39 also has excellent stability and mechanical properties due to its crosslinking structure. As a result, CR-39 has been widely used as a substitute for inorganic glass in the manufacturing of optical lenses.

However, CR-39 has been observed to exhibit several undesirable properties such as undesirably high shrinkage factor (during hardening) as well as relatively low refractive index ($n_D = 1.50$). The volume of CR-39 shrinks by a factor of about 14% during the hardening step. To ensure that the final product conforms to the exact predetermined curvature during molding and avoid optical distortions, a prolonged polymerization time is often required for CR-39 based lenses, usually between about 15–20 hours. Such a long polymerization time results in increased overall manufacturing time and the accompanying operational complexity as well as production cost.

The process of using CR-39 in the manufacturing of optical lenses has been disclosed U.S. Pat. No. 4,146,696, issued to Bond. The lenses made from CR-39 have shown to exhibit excellent chemical stability and abrasion resistance, as well as tolerance to high temperature. However, as described above, the CR-39 lenses require long polymerization time and show relatively low refractive index.

In Japanese Pat. Pub. P1-185501 by Takamizaria, it is disclosed using a thiocontaining urethane resin obtained from the reaction product between polythiol and polyisocyanate in making optical lenses. This polymer shows inadequate heat resistance, and is susceptible to forming gas bubbles with water during the molding process; it often sticks to the mold and makes their release from the mold difficult. Furthermore, polyisocyanate is susceptible to reacting with polythiol at room temperature, thus making this lens manufacturing process difficult to control and resulting in low yield.

SUMMARY OF THE INVENTION

The present invention is the fruit of many years of research effort by the inventor in his attempt to develop an improved plastic optical lens composition that overcomes many of the shortcomings existing in the prior art.

The primary object of the present invention, therefore, is to develop an improved plastic composition for use in the manufacturing of optical lenses that exhibit high refractive index, low shrinkage factor, low specific gravity, and require short manufacturing time. The plastic optical lens composition of the present invention also exhibits excellent heat resistance and can be manufactured with an easily controllable process.

The plastic optical lens composition is prepared from a reaction composition consisting essentially the following components:

Component A: bi-functional 3,9-divinylspirobi(m-dioxane), about 40–60 wt%;

Component B: either styrene or chlorostyrene, about 60–40 wt%;

Component C: maleic acid di-allyl ester, about 3–8 wt% of the aggregate amount of Component A and Component B; and Component D: a free radical polymerization initiator such as benzyl peroxide or dicumyl peroxide, about 1–5 wt% of the aggregate amount of Component A and Component B.

The reaction composition described above can be poured into a mold made from glass mold and resin gaskets, in which it is polymerized at 100°–140° C. for 2–4 hours to obtain a plastic resin with high transparence and excellent hardness, suitable for making optical lenses.

In the reaction composition disclosed in the present invention, Component A, bifunctional 3,9-divinylspirobi(m-dioxane) has the advantages of producing a polymer that has excellent mechanical property, stability and transparence. However, 3,9-divinylspirobi(m-dioxane) is a solid at room temperature, this limits the range of its application. In the present invention, this problem is overcome by co-polymerizing 3,9-divinylspirobi(m-dioxane) lo with Component B, which can be either styrene or chlorostyrene. Both styrene and chlorostyrene are completely compatible with 3,9-divinylspirobi(m-dioxane). Styrene or chlorostyrene also helps maintaining 3,9-divinylspirobi(m-dioxane) in liquid state at room temperature. Furthermore, in the present invention, maleic acid di-allyl ester is added to the reaction composition to increase the polymerization yield of styrene or chlorostyrene and thereby allows the use of injection molding process. Normally, during the self-polymerization of styrene monomers, an elevated temperature (about 180° C.) is required to obtain high conversion ratio. The addition of maleic acid di-allyl ester also improves the cross-linking density of 3,9-divinylspirobi(m-dioxane). This enhances the stability and mechanical properties of the final product.

The amount of styrene or chlorostyrene in the reaction composition should be maintained between 40–60 wt% of the sum of Components A and B. An excess amount of styrene or chlorostyrene could adversely affect the impact resistance and the cutting and grinding processability of the final product. On the other hand, if the amount of styrene or chlorostyrene is too low, it could result in problems in dissolving 3,9-divinyl-spirobi(m-dioxane) and adversely affect the refractive index of the final product. The latter reduces the extent to which the present invention is designed to improve over the CR-39 polymer ($n_D$ should be greater than 1.50).

The choice of the polymerization initiator, such as benzyl peroxide or dicumyl peroxide indicated above, and the amount thereof should be determined by a number of factors, such as: the composition of the plastic resin, the designed polymerization rate and the reactivity of the initiator. Generally speaking, it is preferable that the amount of the polymerization initiator to be used is about 1-5 wt% of the monomers.

The plastic lens composition of the present invention can be polymerized over a wide range of temperatures. However, it is preferred that the polymerization reaction be conducted at temperatures between 100°-140° C. Outside this temperature range, either incomplete hardening of the product can result or the product so obtained may exhibit a tendency to fade into yellowish color.

DETAILED DESCRIPTION OF THE PREFERRED EMBODIMENTS

In the examples that follow, the value of percentage (%) is always referred to weight percent, unless otherwise indicated. Measurements of the other values were made in accordance with the following methods:

1. Refractive index ($n_D$): The values of $n_D$, $n_F$ and $n_C$ were measured using Kalnew refractometer at 20° C. The Abbe number ($V_D$) is defined by the following formula:

$$V_D = (n_D - 1)/(n_F - n_C)$$

2. Specific gravity: Specific gravity was measured according to ASTM D-792 method.
3. Hardness: Hardness was measured according to ASTM D-3363 method.
4. Water absorption rate: Water absorption rate was measured according to ASTM D-570 method; the specimen was soaked in water at 25° C. for 24 hours.
5. Transparence: Transparence was measured according to ASTM D-1003 method; the specimen had a thickness of 2.54 mm and was measured at a wavelength of 550 nm.
6. Crack resistance (heat resistance): The specimen was placed in a hot air oven at 120° C. for three hours; a passing grade (o) was assigned if the specimen did not crack.
7. Solvent resistance: The specimen was placed into different solvents, including acetone, isopropyl alcohol, and benzene, at room temperature for two days; a passing grade (o) was assigned if the specimen did not show any surface change.
8. Impact resistance: Impact resistance of the specimen was measured according to FDA protocol. A copper ball, which had a diameter of 22 mm, and weighed 10 grams, was dropped vertically from a height of 127 cm onto the center of the target lens, which had a thickness of 2 mm. A passing grade (o) was assigned if the specimen did not show any crack.
9. Shrinkage factor: Shrinkage factor of the specimen was measured according to JIS, K-6901 and JIS, R-7112 methods.
11. Linear expansion coefficient: Linear expansion coefficient of the specimen was measured according to ASTM E-831 method, using a thermal mechanical analyzer at temperatures from 75° to 125° C.

The present invention will now be described more specifically with reference to the following examples. It is to be noted that the following descriptions of examples including preferred embodiments of this invention are presented herein for purpose of illustration and description; it is not intended to be exhaustive or to limit the invention to the precise form disclosed.

EXAMPLE 1:

A reaction mixture containing 40 grams of 3,9-divinylspirobi(m-dioxane) (Mw-212), 60 grams of styrene (Mw=104), 3 grams of maleic acid di-allyl ester (Mw=196), and 5 grams of dicumyl peroxide, was thoroughly mixed. After degassing, the reaction mixture was poured into an injecting molding, in which it was reacted at 100° C. for two hours, and at 120° C. for one hour, then the reaction mixture was heated at 140° C. for one hour to effect hardening. The optical lens so obtained was colorless and transparent; it also exhibited excellent toughness and hardness, as well as excellent cutting and grinding processability. The optical lens so obtained was measured to have a refractive index $N_D$ (20° C.) of 1,575, and $V_D=41$. The properties of the optical lens prepared in this example are summarized in Table 1.

COMPARATIVE EXAMPLE 1:

A reaction mixture containing 60 grams of styrene (Mw=104), 3 grams of maleic acid di-allyl ester (Mw=196), and 5 grams of dicumyl peroxide, was thoroughly mixed. After degassing, the reaction mixture was poured into an injecting molding and was reacted at 100° C. for two hours, 120° C. for one hour, then heated at 140° C. for one hour and 160° C. for two hours to effect hardening. The optical lens so obtained was had a yellowish color; it was stuck to the injection molding and was difficult to be released therefrom. The properties of the optical lens prepared in this example are summarized in Table 2.

EXAMPLES 2 AND 3:

The reaction compositions and polymerization procedures in Examples 2 and 3 were identical to that in Example 1, except that the amounts of 3,9-divinylspirobi(m-dioxane) and styrene were 50 grams and 50 grams, and 60 grams and 40 grams, respectively. Other components and polymerization procedures were identical to Example 1. The properties of the optical lens prepared in these examples are summarized in Table 1.

EXAMPLE 4:

A reaction mixture containing 40 grams of 3,9-divinylspirobi(m-dioxane) (Mw-212), 60 grams of styrene (Mw=104), 3 grams of maleic acid di-allyl ester (Mw=196), and 5 grams of dicumyl peroxide, was thoroughly mixed. After degassing, the reaction mixture was poured into an injecting molding and was reacted at 100° C. for two hours, then was heated at 120° C. for one hour to effect hardening. The optical lens so obtained had a refractive index $N_D$ (20° C.) of 1.581, and $V_D=39$. The properties of the optical lens prepared in this example are summarized in Table 1.

EXAMPLES 5 AND 6:

The reaction compositions and polymerization procedures in Examples 5 and 6 were identical to that in Example 4, except that the amounts of 3,9-divinylspirobi(m-dioxane) and styrene were 50 grams and 50 grams, and 60 grams and 40 grams, respectively. Other components and polymerization procedures were identical to Example 4. The properties of the optical lens prepared in these examples are summarized in Table 1.

COMPARATIVE EXAMPLE 2:

The reaction compositions and polymerization procedures in Comparative Example 3 were similar to that described in U.S. Pat. No. 4,146,696 issued to Buckbee-Mears Co., and CR-39 was obtained from the reaction. Reactants were obtained from Polysciences, U.S.A. The properties of the optical lens prepared in this example are summarized in Tables 1 and 3. From Table 1, it is evident that, relative to the CR-39, the optical lens of the present invention exhibited higher refractive index and lower shrinkage factor and specific gravity, and requires substantially shorter time to complete the injection molding process.

for five hours, at 80° C. for three hours, and finally at 110° C. for two hours, to effect polymerization. The final product is a urethane polymer.

Table 3 compares some of the important physical properties of optical lenses prepared from Example 2 and Comparative Examples 2 and 3. This comparison provides further evidence that the optical lens of the present invention exhibits many advantageous properties over those available in the prior art including: lower specific gravity, lower linear expansion coefficient, and involves a more easily controllable manufacturing process, which also requires a shorter reaction time.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. A31 such modifications and variations are within the scope of the present invention as determined by the appended claims when interpreted in accordance with the breadth to which they are fairly, legally, and equitably entitled.

TABLE 1

|  | Example 1 | Example 2 | Example 3 | Example 4 | Example 5 | Example 6 | Comparative Example 2 |
|---|---|---|---|---|---|---|---|
| wt % Component A | 40 | 50 | 60 | 40 | 50 | 60 | CR-39 |
| wt % Component B | 60 | 50 | 40 | 60 | 50 | 40 |  |
| $n_D$ | 1.575 | 1.572 | 1.565 | 1.581 | 1.576 | 1.570 | 1.498 |
| $V_D$ | 41 | 41 | 43 | 39 | 40 | 42 | 58 |
| Specific Gravity | 1.19 | 1.20 | 1.23 | 1.23 | 1.27 | 1.29 | 1.32 |
| Hardness | 4H | 4H | 4H | 3H | 4H | 4H | 4H |
| Shrinkage Factor | 6.9% | 7.0% | 7.2% | 7.5% | 7.3% | 7.3% | 13.6% |
| Water Absorption rate | 0.1% | 0.1% | 0.08% | 0.14% | 0.12% | 0.11% | 0.2% |
| Transparence | 90% | 90% | 90% | 89% | 90% | 90% | 91% |
| Impact Resistance | 0 | 0 | 0 | 0 | 0 | 0 | 0 |
| Solvent Resistance | 0 | 0 | 0 | 0 | 0 | 0 | 0 |
| Crack Resistance | 0 | 0 | 0 | 0 | 0 | 0 | 0 |
| Polymerization Time (hour) | 4 | 4 | 4 | 3 | 3 | 3 | 18 |

TABLE 2

|  | maleic acid di-allyl ester (weight %) | releasability from mold | final polymerization condition | color |
|---|---|---|---|---|
| Example 1 | 3 | 0 (good) | 140° C., 1 hour | none |
| Example 2 | 0 | x (poor) | 160° C., 2 hour | yellowish |

TABLE 3

|  | Specific Gravity | Linear Expansion Coefficient (μm/m/°C.) | Process |
|---|---|---|---|
| Comparative Example 2 | 1.20 | 69 | 0 (easy to control) |
| Comparative Example 2 (CR-39) | 1.32 | 117 | 0 (easy to control) |
| Comparative Example 3 (urethane polymer) | 1.34 | 186 | x (difficult to control) |

COMPARATIVE EXAMPLE 3:

Into a mold formed in a combination of two glass molds and resin gasket, the following reactant mixture was poured: 60 g of m-xylylene diisocyanate, 69 g of pentaerythritol-tetrakis(mercaptopropionate), 0.13 g of dibutyltin salt of lauric acid, and 1.3 g of silicon based nonionic surfactant. The reactant mixture was prepared at 10° C., then was heated at temperatures below 50° C.

What is claimed is:

1. A plastic lens composition prepared from a reaction mixture comprising:
   (a) about 40–60 wt% first monomer which is 3,9-divinylspirobi(m-dioxane);
   (b) about 60–40 wt% second monomer which is selected from the group consisting of styrene and chlorostyrene;

(c) maleic acid di-allyl ester, the amount thereof is about 3–8 wt% of an aggregate amount of said first monomer in (a) and said second monomer in (b); and (d) a free radical polymerization initiator, the amount thereof is about 1–5 wt% of an aggregate amount of said first monomer in (a) and said second monomer in (b).

2. The plastic lens composition of claim 1 wherein said free radical polymerization initiator is selected from the group consisting of benzyl peroxide and dicumyl peroxide.

3. The plastic lens composition of claim 1 wherein said second monomer is styrene.

4. The plastic lens composition of claim 1 wherein said second monomer is chlorostyrene.

5. The plastic lens composition of claim 1 which has a refractive index greater than 1,500.

6. The plastic lens composition of claim 1 which has a specific gravity less than 1.30.

7. The plastic lens composition of claim 1 which has an Abbe number less than 50.

8. The plastic lens composition of claim 1 which has a refractive index greater than 1.56

9. The plastic lens composition of claim 1 which is prepared by a process comprising the following steps:
   (a) injecting said reaction mixture into an injection molding; and
   (b) reacting said reaction mixture at temperatures between 100°–140° C. for three to four hours.

10. A plastic lens composition prepared from a reactant composition consisting essentially of:
   (a) about 40–60 wt% first monomer which is 3,9-divinylspirobi(m-dioxane);
   (b) about 60–40 wt% second monomer which is selected from the group consisting of styrene and chlorostyrene;
   (c) maleic acid di-allyl ester, the amount thereof is about 3–8 wt% of an aggregate amount of said first monomer in (a) and said second monomer in (b); and
   (d) a free radical polymerization initiator, tile amount thereof is about 1–5 wt% of an aggregate amount of said first monomer in (a) and said second monomer in (b).

* * * * *